(12) United States Patent
Kreek et al.

(10) Patent No.: US 7,650,437 B2
(45) Date of Patent: Jan. 19, 2010

(54) SYSTEM AND METHOD FOR MANAGING HARDWARE CONFIGURATION PARAMETERS

(75) Inventors: Conrad Kreek, Waterloo (CA); Jerry Mailloux, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 372 days.

(21) Appl. No.: 11/461,460

(22) Filed: Aug. 1, 2006

(65) Prior Publication Data

US 2008/0126788 A1    May 29, 2008

(51) Int. Cl.
    G06F 3/00    (2006.01)
(52) U.S. Cl. .............................. 710/8; 700/95; 700/107; 700/115
(58) Field of Classification Search .................... 710/30, 710/10; 700/95, 107, 115
    See application file for complete search history.

(56) References Cited

U.S. PATENT DOCUMENTS

| | | | | |
|---|---|---|---|---|
| 5,579,529 A * | 11/1996 | Terrell et al. | .................... | 710/8 |
| 5,812,867 A | 9/1998 | Basset | ................... | 395/800.01 |
| 5,956,408 A * | 9/1999 | Arnold | ........................ | 713/189 |
| 6,096,094 A * | 8/2000 | Kay et al. | .................... | 717/168 |
| 6,539,399 B1 | 3/2003 | Hazama et al. | .......... | 707/104.1 |
| 6,636,962 B1 * | 10/2003 | Sun et al. | ........................ | 713/1 |
| 6,665,675 B1 | 12/2003 | Mitaru | ......................... | 707/10 |
| 6,873,997 B1 * | 3/2005 | Majjasie et al. | .......... | 707/104.1 |
| 7,043,324 B2 * | 5/2006 | Woehler | ..................... | 700/107 |
| 7,259,675 B2 * | 8/2007 | Baker et al. | .............. | 340/572.1 |
| 2002/0133266 A1 | 9/2002 | Landers et al. | .............. | 700/182 |
| 2002/0199110 A1 | 12/2002 | Kean | ........................... | 713/189 |
| 2003/0109949 A1 | 6/2003 | Ikeda et al. | ................... | 700/98 |
| 2006/0052891 A1 | 3/2006 | Ikeda et al. | ................... | 700/97 |

FOREIGN PATENT DOCUMENTS

| | | |
|---|---|---|
| EP | 0696771 A2 | 7/1995 |
| WO | 97/07463 | 2/1997 |
| WO | 99/63434 | 12/1999 |
| WO | 2004/055668 | 7/2004 |

* cited by examiner

*Primary Examiner*—Henry W. H. Tsai
*Assistant Examiner*—Elias Mamo
(74) *Attorney, Agent, or Firm*—Allen, Dyer, Doppelt, Milbrath & Gilchrist, P.A.

(57) ABSTRACT

A system and method manages configuration data within a hardware component of a device to support hardware component changes during development or manufacture of the device. A Standardized Virtual Part (SVP) file is formed as a binary file and includes a SVP header that comprises metadata of one of at least schema version, revision numbers, part numbers, creator and description. The SVP file also includes hardware configuration data and a SVP trailer that includes error checking data for data authentication. The SVP file is loaded onto the device during development or manufacture for configuring the hardware component.

17 Claims, 5 Drawing Sheets

SYSTEM AND METHOD FOR MANAGING HARDWARE CONFIGURATION PARAMETERS

FIELD OF THE INVENTION

The present invention relates to the field of managing configuration data of hardware components and upgrading configuration parameters, for example, in Non-Volatile Random Access Memory (NVRAM) of an electronic device during development or manufacture of the device.

BACKGROUND OF THE INVENTION

Configuration parameters are often associated with a specific function that is required to be managed outside the scope of compiled software binary programs. The software that is programmed into a device and more particularly programmed into its Non-Volatile Random Access Memory (NVRAM), for example, an electronic component as part of a portable wireless communications device, sometimes must be upgraded or changed. The NVRAM is a computer memory chip that does not lose its information when power is turned-off. It is often used in electronic devices to store settings that must survive a power cycle. Typically, the NVRAM is formed as a flash memory and often used in portable electronic devices, for example, a portable wireless communications device.

There are several problems in managing this data in these types of applications. For example, there could be no mechanism to override configuration parameters when updating an Operating System (OS), for example, an Over-The-Air (OTA) firmware update. Also, updating configuration parameters is sometimes problematic because there may be no current or standard descriptive metadata for each set of data, as it is difficult manage different data sets with the same processes. There may also be a limited mechanism for managing schema versions for the data sets because any particular data may not be supported by the operating system and thus, it may be difficult to load that data onto the electronic device, such as its NVRAM. It is desirable if some type of versioning mechanism would permit future OS upgrades and override configuration parameters in the NVRAM for some type of new data in the OS binary data base with a standard set of descriptive metadata. Typically, metadata is "data about data" and relates to information or data that describes another set of data. When directed to a higher hierarchical arrangement, it is also termed "schema." Metadata can also be used to describe a single set of data as a resource. There could be some data formatting, but it may not have any system for managing it for use in the operating system.

BRIEF DESCRIPTION OF THE DRAWINGS

Other objects, features and advantages will become apparent from the detailed description which follows when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A method and system manages configuration data within a hardware component of a device to support hardware component changes during development or manufacture of the device. A Standardized Virtual Part (SVP) file is created as a binary file comprising a SVP header that comprises metadata of one of at least schema version, revision numbers, part numbers, creator and description. The SVP file also includes hardware configuration data that includes part-specific data for configuring the hardware component. A SVP trailer includes error correction data for data authentication. The SVP file is loaded into a device during development or manufacture for configuring the hardware component.

In one aspect, the SVP trailer includes a cryptographic signature for authenticating SVP files. The SVP file can be loaded into a Non-Volatile Random Access Memory (NVRAM) of the device from a Bill of Material (BOM) for the device. The SVP file can be contained within a database containing manufacturing data about the device before loading the SVP file onto the device, and loaded onto the device using Serial Transfer Protocol (STP) commands The header can include a part number and version embedded within the header for tracking hardware configuration data. Register settings can be configured within the hardware component based on the hardware configuration data of the SVP file.

In one non-limiting aspect, the SVP file can be loaded using a SVP manager application on the device that is operable for providing at least one of authenticating SVP files, STP commands for loading SVP files, SVP file schema version and revision control on the device and upgrade/downgrade scenarios. The SVP file is preferably stored within a database and is released to an appropriate Bill of Material (BOM) before loading the SVP file onto the device.

A system can manage configuration data and includes the database having data related to the manufacturing of the device and at least one binary Standardized Virtual Part (SVP) file that includes the header, hardware configuration data and trailer. The device on which the SVP file is loaded can include a SVP manager application that is operable for at least one of authentication of the SVP files, STP commands for loading SVP files, SVP file schema version and revision control on the device and the upgrade/downgrade scenarios.

A Standard Virtual Part (SVP) binary file that is used for managing configuration data within a hardware component of a device to support hardware component changes during development or manufacturing is also set forth.

In accordance with a non-limiting example, a set of hardware configuration data can be combined with standard metadata, for example, a description, type, size, versions of data or software, which for purposes of this description is a file that can be referred to as a Standardized Virtual Part (SVP). The SVP can exist as a file that could be loaded into the NVRAM, e.g., flash memory of an electronic device, for example, a portable wireless communications device. A default SVP could also be compiled into the operating system. An example could be register settings for a Liquid Crystal Display (LCD).

The SVP file could be formed by a header, the data, and a "trailer." It should be understood that the SVP could be considered more than a file format because it can specify a data format along with a system for managing the data. Other components of the SVP could include a SVP manager operative with an operating system to read and write SVPs to the NVRAM and manage different versions and revisions of the SVPs. A PC-side tool could be operative for reading and writing the SVPs, and PC-side scripts for creating SVP files. Different manufacturing processes could be used for programming SVPs on an assembly line and dealing with rework scenarios. Different Practical Extraction and Report Language (PERL) scripts could be used for creating SVPs, for example, a PERL code that reads and writes SVP file headers.

In a SVP manufacturing process, a SVP part type different from previous part types could be saved in a database, also termed the Matrix database, which could be stored in different Bills Of Material (BOM). Manufacturing code implementation tools could load SVPs on an assembly line. For example, the LCD SVP could be loaded before an automated test This would enable manufacturing flexibility and support minor component changes throughout the lifetime of the product, without requiring new software configuration management builds to support the changes. There are a number of good candidates for the SVP in accordance with a non-limiting example. For example, if the same parameters are used to create and modify special builds repeatedly, then an SVP could be used. Also, if a high number of Serial Transfer Protocol (STP) commands are used to control a specific peripheral, then an SVP could be used.

It should be understood that SVP can be considered a file format that holds hardware configuration parameters, along with systems and processes for managing these files. SVP files are created by developers or hardware engineers to control specific hardware components, for example, an LCD. SVP files can be used to change LCD interface timings, or adjust LCD gamma settings, as non-limiting examples when used in conjunction with an LCD.

SVP files typically are loaded into the NVRAM of a device to control the hardware for development purposes. They can be located at the factory to support running hardware changes during the lifetime of a product. SVP files typically do not contain executable software. SVP files contain hardware configuration parameters and are managed in terms of processes similar to a hardware component, and not like a software component.

SVP files enable a number of improvements. For example, SVP files can enable a faster development cycle. In the example of the LCD, LCD SVP files can be created and loaded onto an LCD to "tweak" LCD controller settings to test or verify those settings. Development time is shortened because testers and hardware engineers are able to change device settings without requiring special builds or support from a software developer. SVP files can also improve manufacturing flexibility. For example, in the LCD manufacturing process, SVP files can be loaded on the assembly line to support LCD optimizations or cost-reduced LCD panel modifications requested by an LCD supplier. Manufacturing flexibility is achieved because new hardware components can be supported by simple SVP file changes on the assembly line, rather than requiring new Software Flash Image (SFI) software builds, which carriers may not accept once a product starts shipping.

For example, an LCD provided by another supplier could save money per device, but the change may not be supported because it would require changing the register settings in the device. The SVP file incorporates a general purpose, virtual part format to be used by any type of software driver, which includes several features, including but not limited to the storage of important metadata, e.g., a schema version, a revision number, a part number, a creator and description in a header for each SVP file, and secure cryptographic signature and CRC checksum for authentication. SVP can handle software upgrade/downgrade scenarios, overriding SVPs stored in NVRAM, and checking for old or new SVP file formats.

An overall SVP file system can program SVPs on the assembly line with support for rework scenarios. An SVP file system can include a process for numbering/revisioning SVPs in the Matrix database that takes into consideration recertification scenarios. It can include a process for crypto-signing SVPs by SCM. This guarantees authenticity of SVP files loaded onto each device and eliminates any security risk. It can also define a process for handling recertification issues. Non-limiting examples of an SVP is an LCD virtual part. Another use for the SVP could be a light sensor virtual part, which would contain light sensor threshold values. An SVP can be used in general purpose applications, however.

SVPs have several benefits. An SVP has the ability to manage hardware configuration parameters using the same processes as are used to manage hardware components. For example, configuration data, stored in SVP files, are stored in the Matrix database and can be released to the appropriate BOMs as necessary. Therefore, any component change that requires an SVP change can be handled by adding both the new component and the associated SVP to the BOM. No other hands-on management is required. For example, the change does not need to be synchronized with builds released by SCM. Recertification scenarios for SVP changes can be handled in the same manner as running hardware changes.

An SVP can give greater visibility and control of software parameters to the stakeholders or "owners" of these parameters. For example, a Display Group could "own" the LCD power-up routines and interface timings, but many have little control or visibility into them because they are stored in the OS binary code. Using an SVP, the Display Group can view and control updates to these routines in the Matrix database.

SVPs can change without requiring recompiled software binaries. Any parameter stored in an SVP file can be changed in the factory without requiring a new SCM build to support that change. Similarly, SVPs can be altered and loaded for testing purposes. This takes the software developer out of the loop in many development/testing scenarios. This greatly speeds product development.

An SVP can provide a consistent and generic system to support the loading of hardware configuration data in the plant. Once in place, it will be very straightforward for new types of hardware configuration data to use the SVP mechanism. SVP supports important data authentication (cryptographic signature). SVP provides important tractability of configuration data because each SVP contains a part number embedded within it.

SVP provides the ability to manage a set of hardware configuration parameters in a file as if the file were a hardware part. SVP specifies a file format along with any required development tools and manufacturing systems for managing these files.

Each SVP file, which holds a set of hardware configuration data for a particular piece of hardware, is given a part number. Each SVP file is stored in the Matrix database. An SVP part can be included in a BOM for any manufactured device platform. On the assembly line, applications automatically select the correct SVPs from the BOM being manufactured and intelligently load the SVP into the NVRAM or other similar memory on each device.

An SVP file has different components. For example, the SVP binary file format is part of the SVP file, which is programmed into the device NVRAM. It contains hardware configuration parameters for controlling a specific piece of hardware. Each SVP file contains a standard header containing metadata, for example, a part number and a standard trailer containing a cryptographic signature for authentication.

Another SVP component is the SVP manager, which can be used on the particular device in question. The SVP manager is software in the OS that manages SVPs, for example, by loading SVPs and selecting between SVPs stored in NVRAM or the OS. Also, the SVP Manager provides an engineering screen for viewing SVPs loaded onto a device.

SVP files can also be stored in the Matrix database for release to BOMs. When a particular BOM is manufactured, the appropriate SVPs can be loaded by one or more applications on the assembly line.

Each SVP file is a binary file containing three sections: 1) a SVP header (versioning, type, other info); 2) hardware configuration data; and 3) SVP trailer (cryptographic signature and CRC). Details of an exemplary SVP file are set forth in Table I.

TABLE I

SVP Binary File Format
SVP FILE

SVP Header

Part Number: SVP-18934-398
"Settings for Sony Sapphire LCD"
LCD Schema 1.4
Revision 6
756 Bytes
Built by xxxx on May 30th, xxxx
Hardware Configuration Data
(format specific to LCD schema 1.4)

Set register 0x23 to 0x1432
Set register 0x25 to 0x4321
Set register 0x32 to 0x0000
. . . . . . etc.
SVP Trailer CRC checksum
Cryptographic signature In a non-limiting example, the SVP File Header holds necessary version-control data, a description of the creator and the creation date, along with the size of the part data. An example of the header layout is shown in Table II, showing a header size of 148 bytes.

TABLE II

File Header Layout

| Size | Header Item | Description |
|---|---|---|
| 4 bytes | SVP File Cookie | Unique ID that specifies this ID as an SVP file |
| 2 bytes | SVP Schema Major Version | This version number indicates the version of this file header. It will be used in the future to add new items to this header (if necessary). This number is increased when a change breaks compatibility with previous header versions. |
| 2 bytes | SVP Schema Minor Version | Version number that can be increased to track SVP schema changes that do not affect backwards compatibility. |
| 2 bytes | SVP header length | Length of SVP file header (in bytes). This will allow backwards compatibility to header file additions, if necessary. |
| 2 bytes | Part Type | Indicates what kind of part this is (LCD settings or light sensor thresholds or . . . ) |
| 2 bytes | Part Schema Major Version | This version number indicates a schema version specific to this part type. It allows version control of the part-specific data in this file. This number is increased when a change breaks compatibility with previous part schema versions. |
| 2 bytes | Part Schema Minor Version | Version number that can be increased to track part schema changes that don't affect backwards compatibility |
| 2 bytes | reserved | reserved |
| 2 bytes | Part Revision | This is the revision number of this part. This part version is compared between each SVP stored in NVRAM and the default stored in the OS binary to determine which should be used (whichever has the highest version). |
| 4 bytes | SVP Loading ID | Specifies where on the assembly line the SVP was programmed. This value is added to the file at load time. |
| 4 bytes | Data size | Number of bytes in the part data. |
| 64 bytes | Part Description | ASCII string description of this part. |
| 16 bytes | Part Number | ASCII string containing the Matrix database part number. |
| 16 bytes | Part Creator | ASCII string with creator's user id |
| 12 bytes | Part Creation Date | ASCII string specifying creation date |
| 12 bytes | Part Creation Time | ASCII string specifying creation time |

The SVP File Trailer includes a Cyclic Redundancy Check (CRC) and cryptographic signature. A trailer is added to SVP files, which holds a 128-bit RSA cryptographic signature along with a 32-bit CRC checksum value. These two elements guarantee the authenticity of each SVP file that is to be stored in the Matrix database and later, loaded at the factory. A trailer is added to SVP files, which holds a 128-bit RSA cryptographic signature along with a 32-bit CRC checksum value. These two elements guarantee the authenticity of each SVP file that is to be stored in the Matrix database and later, loaded in the factory.

For development purposes, the cryptographic signature is optional. Insecure or device-branded devices can use unsigned SVP files for development convenience. However, a shipping code will reject any SVPs in the NVRAM, i.e., the flash or other memory that are not cryptographically signed.

SVP hardware configuration data is part of each SVP file, which contains part-specific hardware configuration data follows the SVP header. This data can be organized differently depending on end-use or design requirements. When the OS reads an SVP file, it uses the part type to determine which software driver will be used to interpret this hardware configuration data. For example, if an SVP file holds light sensor data, this file would have a Part Type ID number that specifies "light sensors" When the OS reads this SVP file, it will pass the part-specific data into the light sensor software driver for processing.

The SVP Manager is software that runs as part of the device OS. It provides for:
1) Authentication of SVP files;
2) STP commands for loading SVP files;
3) Engineering screening of SVP information;
4) A SVP file schema version and revision control on the device; and
5) Handling of upgrade/downgrade scenarios.

SVP files are considered authentic if they contain a valid (RSA) cryptographic signature and a valid CRC checksum. It should be understood that authentic can mean that the SVP file was created and contains valid hardware configuration information. The SVP Manager prevents attempts to use SVP files for malicious purposes by ensuring that SVP files used on each device are authentic.

An RSA signature can be added to each SVP file that is released for use in shipping products. This signature can be added to the file by SCM. If an SVP file does not have a valid RSA signature, then the SVP Manager will only allow this file to be used on development devices. The file, if loaded into NVRAM, will be ignored on shipping devices.

The Cyclic Redundancy Check (CRC) checksum must be valid (even on development devices). This checksum validates that the SVP file was created by an appropriate SVP creation tool. If the CRC checksum, is invalid then the SVP file will be ignored.

Figure 1:
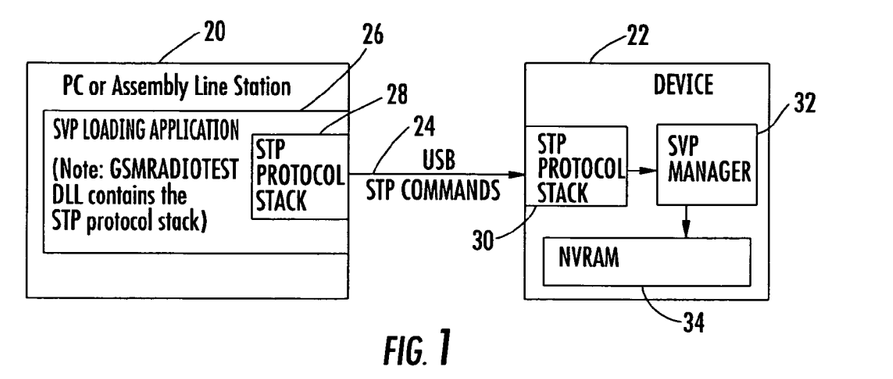
FIG. 1 is a high-level block diagram showing basic components of a PC or assembly line station used in a manufacturing environment operative with an electronic device, for example, a portable wireless communications device, for loading a Standardized Virtual Part (SVP) file.

FIG. 1 is a high-level block diagram showing a non-limiting example of an overview of how SVP files are loaded into NVRAM and onto a device. Each SVP file is sent from a PC, or Assembly Line Station 20, to the device 22 via STP commands 24 using a USB in the example. As illustrated, the station 20 includes a SVP loading application 26 and STP protocol stack 28. In this example, a GSM radio test DLL contains the STP protocol stack. The device 22 includes the STP protocol stack 30, SVP manager 32 and the flash memory as the NVRAM 34. The SVP Manager 32 receives the files and writes them to NVRAM 34 after validating each file.

Two Serial Transfer Protocol (STP) commands are provided for handling SVPs.
1. SIG_RIM_SVP_ACCESS_REQ provides 3 functions:
   a. writing SVP files to device NVRAM (file will not be written if SVP Schema Major version, Part Major Version, or CRC checksum are incorrect);
   b. reading SVP files from device NVRAM (used during development); and
   c. deleting SVP files from device NVRAM (used during development);
2. SIG_RIM_SVP_REWORK_REQ selectively wipes SVPs stored in NVRAM for handling rework scenarios. This is a special command that is used for handling complicated rework scenarios in manufacturing.

If SVP files are loaded at more than one station on the assembly line, there are important rework scenarios that must be handled. SIG_RIM_SVP_REWORK_REQ must be executed at each assembly line station that is capable of loading SVPs before programming the first SVP at that station. When executed, this command wipes all existing SVPs from NVRAM that were previously programmed at that station, or at any stations later in the line. This ensures that any old/conflicting SVPs are removed, and protects against situations where an SVP is loaded onto a device during its first run through the line. An SVP is not loaded during the rework. It is important that the old SVP does not remain in NVRAM.

An SVP Loading ID value specifies the station where each SVP is programmed such as shown in Table III. These ID values increase as each station gets further to the end of the assembly line. Intermediate values between each ID are reserved in case support at other assembly line stations are added in the future. Each product will have a unique set of SVP Loading ID values, corresponding to the stations that will load SVP files. The highest number is reserved for development purposes, so that any development files left on a device are sure to be wiped. An example is shown in Table III.

TABLE III

| Assembly Line Station | SVP Loading ID Value |
|---|---|
| ASY Station | 400 |
| Config & Pack Station | 800 |
| Manually load SVP for development | 12000 |

For example, when a device arrives at the ASY Station, the SIG_RIM_SVP_REWORK_REQ command is sent along with the ID value 400. When the SVP Manager receives this command, all SVPs previously programmed at stations with ID 400 and above will be wiped before proceeding.

If an SVP is loaded manually on a device, during development, for example, then it is given an ID of 1200 as a non-limiting example, which is higher than all other SVP Loading IDs. This ensures that all manually-loaded SVPs will be wiped should a device be reinserted into the line.

An SVP engineering screen can display header information for all SVPs on the device. Both copies, i.e., copies in the NVRAM and OS, will be shown, along with an indication which copy is active. This engineering screen is available in all software builds with loaded Java applications.

In one non-limiting example, there are three version numbers specified in each SVP file:
1. SVP Schema Version (major and minor);
2. Part Schema Version (major and minor); and
3. Part Revision.

The SVP Manager uses these different versions in different ways. The SVP schema version applies to the SVP file header and trailer, the SVP STP commands and the loader tool. This number is also referred to as the SVP Manager Version. This version number will initially be set to a value of 1 and will only be increased if changes are made to the SVP file header format or SVP STP commands functionality.

However, if needed, this version number will allow these changes to be handled correctly. For example, an older device may support an older SVP version. If a user attempts to load a newer SVP file, which has new items in the SVP file header, the old device will reject this newer file because it does not know how to process the new SVP file header items.

Increments in the SVP Schema Major Version denote incompatible changes. A minor version is used to track backwards-compatible changes.

The part schema version applies to the format of the part-specific hardware configuration data stored in the SVP file. It functions the same way as the SVP Schema Version, except that it applies only to SVP files with a specific part type. For example, an SVP file could contain LCD register settings. In the future, it is possible that new types of registers will be supported. If this were to happen, it would be possible to increase the LCD Part Schema Version and thus drop support for all old LCD SVP files. If an attempt is made to load a file with an old, unsupported LCD Part Schema Version onto a device, the SVP Manager will reject this older SVP file.

Increments in the Part Schema Major Version denote incompatible changes. A minor version is used to track backwards-compatible changes.

Part revision number specifies the revision of the part-specific data. This number is used by the SVP Manager to select between the SVP part stored in NVRAM and the default compiled into the OS. Whichever part has the highest version number is selected and used.

Figure 2:
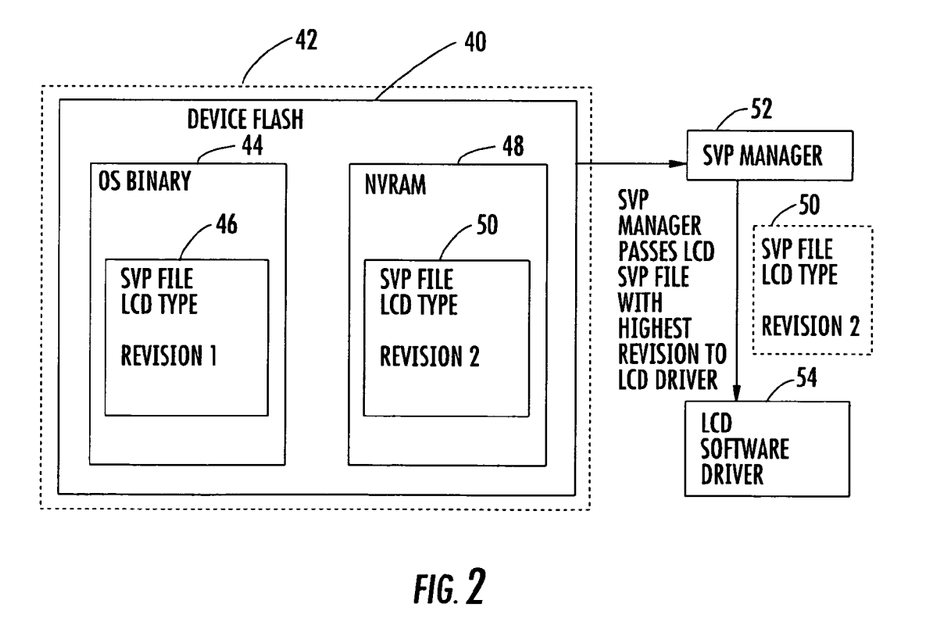
FIG. 2 is a high-level block diagram showing a flash memory for an electronic device and operative with an SVP and Liquid Crystal Display (LCD) driver.

An example of selecting a LCD SVP file based on the revision number is shown in the high-level block diagram of FIG. 2. A flash memory 40 for a device shown by the dashed lines at 42 includes the OS binary file 44 with the SVP file and LCD type as a revision 1 46 and the NVRAM 48 with the SVP file and LCD as revision 2 50. The flash memory is operative with the SVP Manager 52, which passes the LCD SVP file with the highest revision (shown by 50) to the LCD Software Driver 54.

In a non-limiting example, an SVP that is compiled into the OS will have a particular Part Revision, e.g., 1. It is also possible to override the OS SVP default part by loading an SVP in the factory with a Part Revision of 2. It is also possible to release a firmware update that includes an SVP part with a Part Revision of 3 compiled into the OS. This would override what was programmed into NVRAM in the factory. This cycle can continue as an SVP with an even higher Part Revision could be loaded at the factory to override the SVP in the updated OS.

This functionality allows significant flexibility in updating an SVP on a device through a firmware upgrade to improve functionality or correct errors. Similarly, SVPs can be loaded into device NVRAM in the factory or RMA to override any SVP existing in software to improve functionality, correct errors, or even support updated hardware with an older software bundle.

It is possible that firmware on a device could be upgraded or downgraded after SVP files have been loaded into NVRAM. This can lead to situations where the newly loaded firmware is incompatible, for example, either too old or too new, with the SVP files in NVRAM. The SVP Manager protects against situations like this by validating each file on startup using the schema version numbers, cryptographic signature and CRC checksum. Any invalid SVP files found in NVRAM are ignored and not used.

There now follows a non-limiting example of a manufacturing process using a SVP. Before an SVP file can be added to the Matrix database, it is created by a development team and signed and released by SCM 1 for example, for authentication and tracking purposes.

A simple SCM release process is used for adding the cryptographic signature to SVP files before they are added to the Matrix database. SVP files are created and tested by developers The approved SVP file is put into a project database pickup by SCM, signed and released. A non-limiting example of this process includes the following steps:

1) The SVP is created by hardware engineers with help from an OS Group, e.g., lcd_settings.svp;
2) A part number is selected for the SVP file, e.g., SVP-12345-678;
3) A file is added to an accepted tree in Perforce according to a chosen part number, for example, //depot/projects/SVP/SVP-12345-678/lcd_settings.svp;
4) A build request is submitted to SCM;
5) SCM applies a part number to the file, e.g., lcd_settings.svp becomes SVP-12345-678.svp;
6) SCM adds a cryptographic signature to the file, e.g., SVP-12345-678.svp is signed;
7) The authenticated file is released, erg, SVP-12345-678.svp is copied to the release network drive; and
8) The file is ready for addition to the Matrix database, e.g. SVP-12345-678.svp is added as a part in the Matrix database.

Once an SVP file has been released by SCM, it can be added to the Matrix database. Any SVPs that are to be loaded on the assembly line are stored in the Matrix database and released to an appropriate BOM. SVP files released by SCM should be added to the Matrix database The appropriate checks should be added to Matrix to prevent un-signed files from being added.

In one non-limiting example, SVP parts have part numbers that begin with the prefix "SVP-" i.e. SVP-XXXXX-YYY. When the SVP part is created, the SVP file is attached. Also, an SVP Class is associated with the SVP part. This class is functional, for example, the LCD, or Light Sensor Thresholds, or Audio, or similar examples. This SVP Class can be used later by applications on the assembly line to select which SVPs they are responsible for loading.

SVP part numbering or revisioning works similar to hardware parts. The part number is increased to denote non-compatible changes and the revision is increased to mark compatible changes and slight improvements.

Also, incrementing the Part Number can denote that the update requires recertification for RF compliance. Incrementing the revision can specify a non-certification impacting change.

This SVP numbering convention can increment the BOM container part number where appropriate. This helps track SVP changes that do or do not impact certification.

Figure 3A:
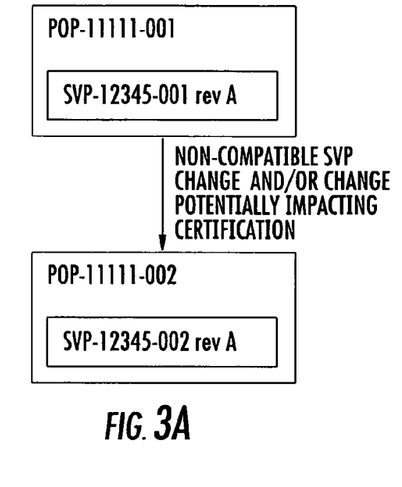
FIGS. 3A and 3B are high-level block diagrams showing examples of a SVP part numbering for a non-compatible SVP and minor "compatible" SVP change.
Figure 3B:
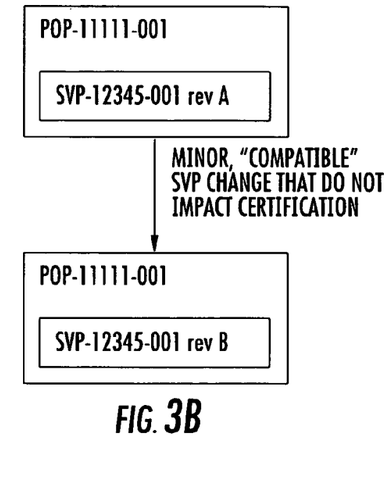

FIGS. 3A and 3B shows part numbering examples as non-limiting examples. FIG. 3A shows a non-compatible SVP example, and FIG. 3B shows a minor "compatible" SVP change.

A process for updating an SVP and releasing it to a BOM is now described. The described process can be used for BOM changes after a product has passed certification. During early development of a new product, this process is optional. In this non-limiting example:

1) An updated SVP is added to Matrix and the Part Number or Revision is incremented appropriately;
2) The development team verifies functionality of the new SVP;
3) Device/software is provided for SV&V to run a Carrier Release Test to verify general functionality of the device, while specialized SV&V tests may be requested if applicable, for example, LCD tests for an LCD SVP change;
4) The RF certification team gives approval; and
5) The SVP is released to BOM.

Ownership for SVP changes can be joint between the software developer and hardware group that owns the feature affected by the SVP.

For each manufactured product, a table is defined that specifies which applications on the assembly line will load which types of SVP files. In addition, the applications are given unique and increasing SVP Loading ID numbers that specify the position in the assembly line where the SVP loading takes place.

An example of SVP manufacturing details as described is shown in Table IV.

TABLE IV

| Assembly line application | SVP file types loaded | SVP Loading ID |
|---|---|---|
| BLT (Board Level Test) | LCD, Backlight | 100 |
| SWConfig | Light Sensor Calibration | 200 |

This table is stored in a manufacturing database, for example, using Microsoft Access or other database program. Each assembly line application can access the table.

Before production begins, a configuration step is performed by a tool called PRDAdminTool. During this configuration step, PRDAdminTool retrieves the SVP Manufacturing Table from the manufacturing database, along with all SVP files from the Matrix database that are specified in the BOM being manufactured.

The SVP files are placed on a network drive that is accessible to the assembly line applications. These files are organized in a directory structure organized first by the application responsible for loading the files and second by the SVP Loading ID.

Figure 4:
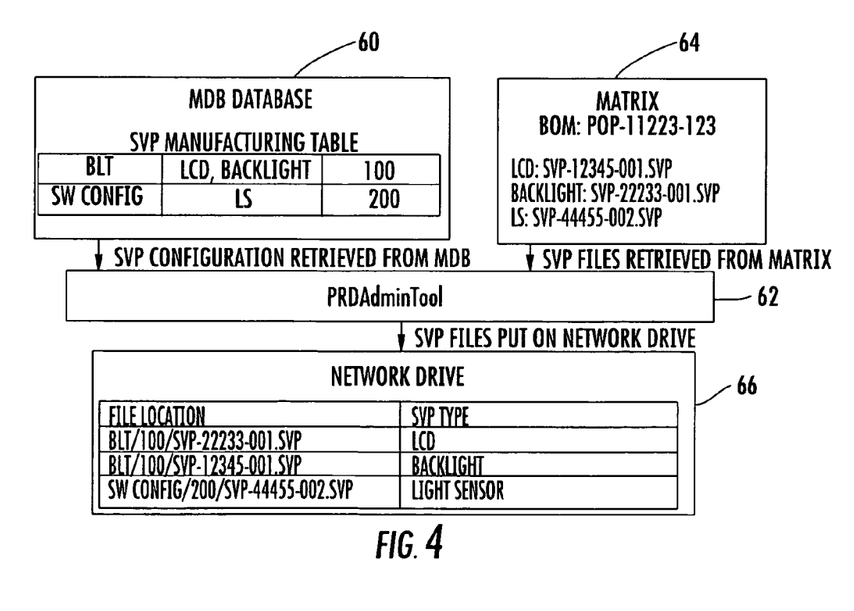
FIG. 4 is a high-level block diagram showing configurations for SVP files on a manufacturing database, a matrix database and network drive in accordance with a non-limiting example.

FIG. 4 shows an example of the configuration and manufacturing steps. As shown in FIG. 4, the manufacturing database (MDB Database) 60 is operative with the Production Administration Tool (PRD AdminTool) 62, which receives the SVP configuration from the manufacturing database. It also receives SVP files from the Matrix database 64. The PRD AdminTool 62 places the SVP files on the network drive 66 as illustrated.

As devices are manufactured, they proceed from one manufacturing station to the next manufacturing station in sequence on the assembly line. If an application running at a given station is responsible for SVP loading, it checks the Network Drive location corresponding to itself. For example, the Back Light (BLT) application checks the BLT directory on the network drive to see if there are any SVP files to load. If files are present in that location, then the file is loaded into NVRAM on the device using the SVP Loading ID specified by the SVP file location on the Network Drive.

If a part classification has been accomplished, such as with a database, e.g., an Oracle database, it would be possible for applications on the assembly line to query the database to configure themselves and determine which files to load. It can determine the SVP Loading ID value. Files could be automatically drawn from a common network drive without requiring any setup by the PRDAdminTool 62.

SVP is designed to handle factory rework scenarios where a device is moved back to an early stage on the assembly line to be "reworked," to fix problems, or change components on a device This is accomplished through the use of the "SVP Loading ID" that is specified each time an SVP file is loaded into NVRAM.

Each time an SVP is loaded onto a device, the SVP Loading ID is stored along with the SVP file. Later, if the device is reworked, this SVP Loading ID is used to determine whether or not the previously loaded SVP file should be removed during the rework process.

When a device arrives at an assembly line station that has SVP loading capability, the STP command SIG_RIM_S-VP_REWORK_REQ is executed before loading any SVPs. The station is able to load SVPs. SIG_RIM_SVP_RE-WORK_REQ specifies the SVP Loading ID of that assembly line application, and tells the device to wipe all SVPs stored on the device with IDs of that value or higher. The reworked device has a clean slate at that location in the assembly line.

For example, when a device arrives at the Assembly (ASY) station, SIG_RIM_SVP_REWORK_REQ wipes all SVPs out of NVRAM that were previously loaded at the ASY or later stations, including any software configuration (SWConfig) station Once this is done, loading of any SVPs can commence.

Following this process will enable proper handling of these rework situations:
1. There is a previously loaded SVP file on the device, but during the rework, a new SVP will not be loaded and the old SVP is properly wiped during rework;
2. There are SVP files on the device previously loaded at BLT, but a device is only re-worked at the SWConfig station, and the BLT SVPs will correctly not be wiped when previous SWConfig SVPs are wiped at the SWConfig station during rework; and
3. Any newly loaded SVPs written during rework will properly write as expected.

There are possible rework scenarios. Software Configuration (SWConfig) rework scenarios could include:
1) an optimal scenario in which a device goes through each station and obtains a standardized bundle that is loaded, including AVP and gets shipped out;
2) a defect is found after the SWConfig station where the device gets reworked and placed back in the line or into storage, known as WIP devices;
   2a) the device goes back to the SWConfig station and obtains the same standardized loaded bundle;
   2b) the device goes back to the SWConfig station and obtains a newer standardized loaded bundle;
   2c) the device goes back to the SWConfig station and obtains an older standardized bundle loaded; and
   2d) the device goes back to the SWConfig station and obtains a bundle loaded without an SVP part.

In no case is the NVRAM explicitly wiped.
There are Assembly (ASY) station rework scenarios:
1) an optimal scenario in which a device goes through the station and is not seen again;
2) a defect after the station results in:
   2a) the device going through with the same ASY as before;
   2b) the device obtains a new plastic and goes through as a different ASY;
   2c) in addition to 2a and 2b, the POP gets updated with new parts.

These are possible rework scenarios. The RMA (Returned Merchandise Authorization department) process could follow the same procedures as manufacturing for any devices that it refurbishes. This will ensure that any SVPs are removed or added as necessary to support the refurbished device.

If a particular SVP change is known to affect certification, it may face limitations. It is likely, however, that many SVPs will not affect certification. The issue will define a process by which this can be determined for each SVP. SVP changes in the factory will face the same limitations and caveats that running factory hardware changes face. A process will have to be clarified that would govern both SVP or hardware part changes in the factory to determine if such a change affects certification.

The SVP specification is flexible enough to support any type of hardware configuration parameters. The SVP specification will not be restricted to a certain type of data.

SVPs are loadable using an STP command. This will allow support for SVP loading to be easily added to manufacturing tools.

Two copies of each SVP can be supported. One is supported in the OS and a second is supported in NVRAM. For each SVP, a default copy is stored in the OS. A second copy can be programmed into NVRAM, which can override the default in the OS. This will allow the device OS to function even if there is no SVP programmed in the NVRAM.

Firmware upgrades allow the NVRAM copy of an SVP to be overridden. A mechanism can be in place to allow a future OS upgrade to override the SVP copy stored in NVRAM.

Corrupt or invalid SVP files can be identified and not used by the OS. If a corrupt or invalid SVP file is loaded into NVRAM, the OS will detect the problem and use the OS default instead. SVP files will be checksummed and cryptographically signed to verify authenticity.

Manufacturing rework and RMA scenarios can be supported. Possible manufacturing and RMA scenarios must be identified and supported by SVP. An engineering screen can display the SVPs present on the device.

Figure 5:
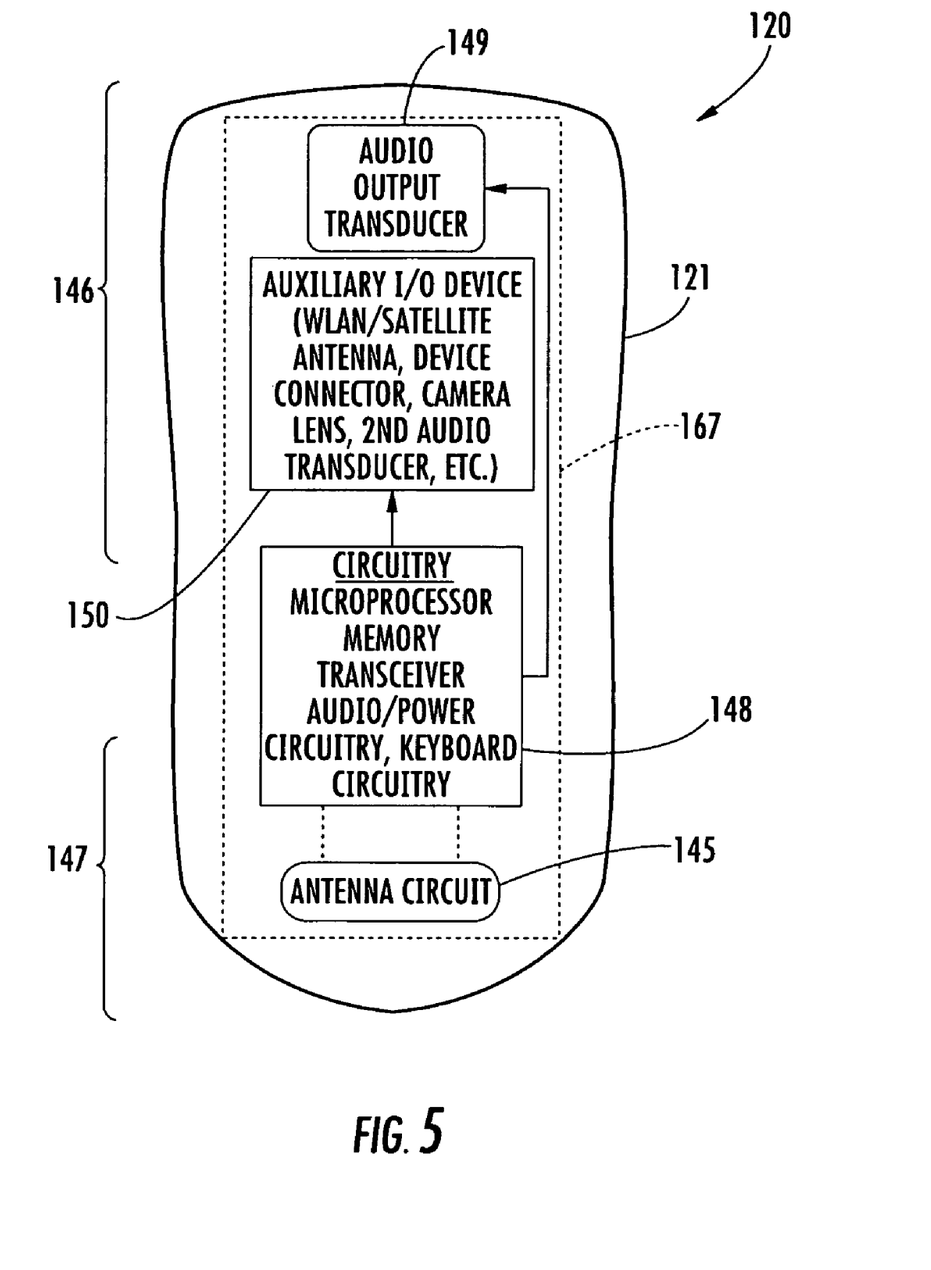
FIG. 5 is a schematic block diagram of an example of a mobile wireless communications device configured as a handheld device that could include at least one NVRAM in accordance with non-limiting examples and illustrating basic internal components thereof that could be upgraded as described below.
Figure 6:
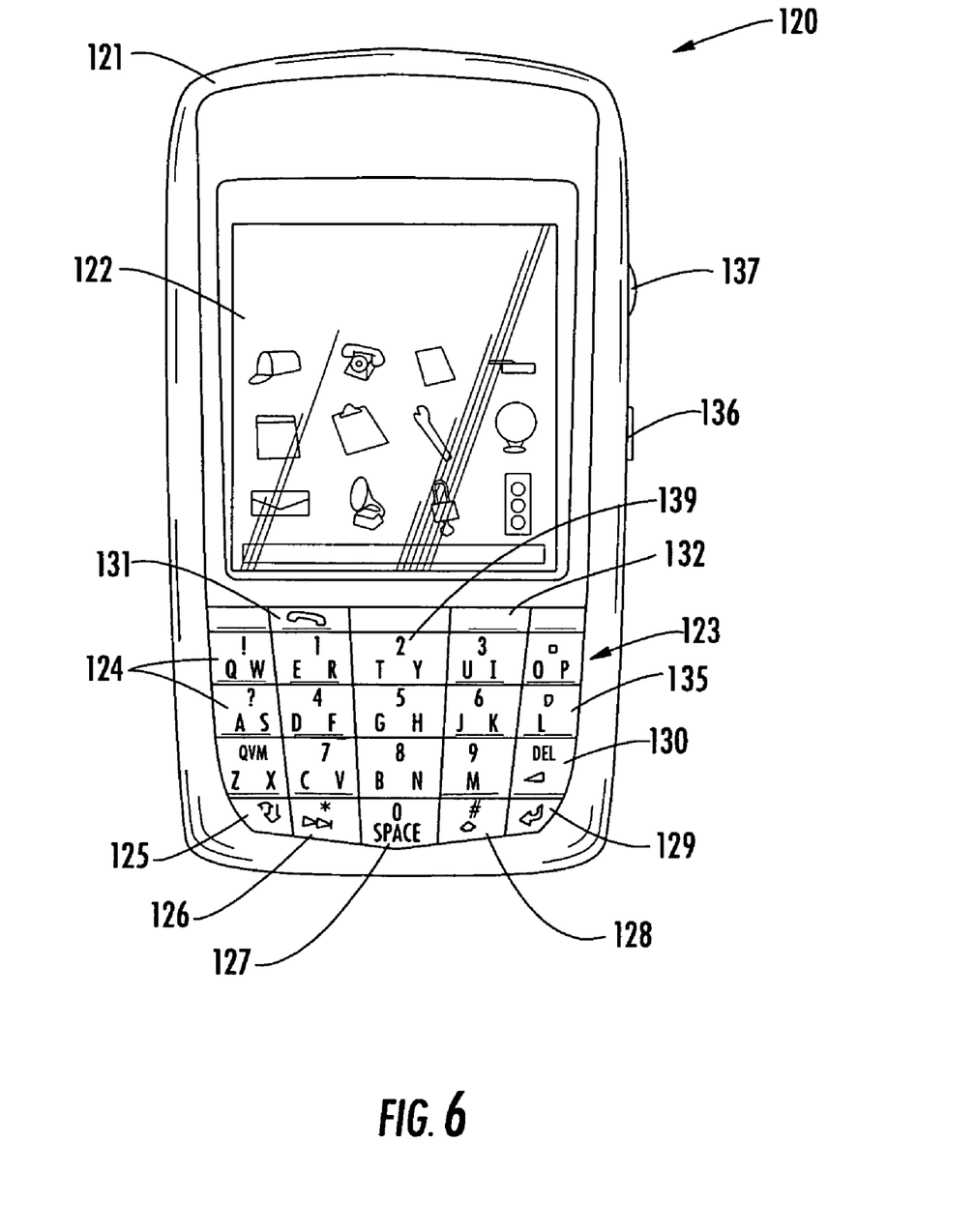
FIG. 6 is a front elevation view of the mobile wireless communications device of FIG. 6.
Figure 7:
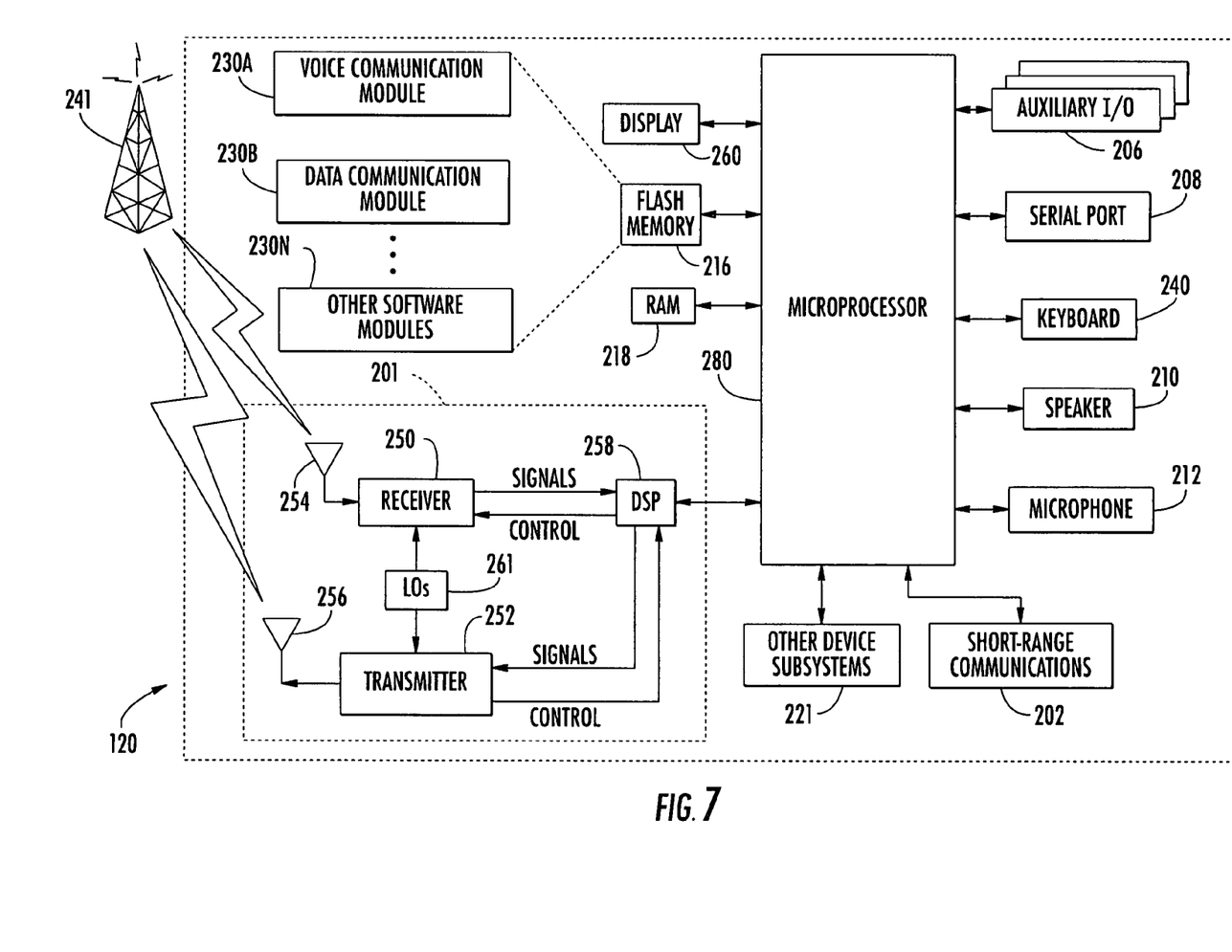
FIG. 7 is a schematic block diagram showing basic functional circuit components that could be used in the mobile wireless communications device of FIGS. 6 and 7.

A brief description will now proceed relative to FIGS. 5-7, which disclose an example of a mobile wireless communications device, for example, a handheld portable cellular radio, which can incorporate non-limiting examples of various circuits that can include components with NVRAM modules for SVP. FIGS. 5-7 are representative non-limiting examples of the many different types of functional circuit components and their interconnection, and operative for use with low-IF receiver circuitry.

Referring initially to FIGS. 5 and 7, an example of a mobile wireless communications device 120, such as a handheld portable cellular radio is first described. This device 120 illustratively includes a housing 121 having an upper portion 146 and a lower portion 147, and a dielectric substrate (i.e., circuit board) 167, such as a conventional printed circuit board (PCB) substrate, for example, carried by the housing. A housing cover (not shown in detail) would typically cover the front portion of the housing. The term circuit board 167 as used hereinafter can refer to any dielectric substrate, PCB, ceramic substrate or other circuit carrying structure for carrying signal circuits and electronic components within the mobile wireless communications device 120. The illustrated housing 121 is a static housing, for example, as opposed to a flip or sliding housing which are used in many cellular telephones. However, these and other housing configurations may also be used.

Circuitry 148 is carried by the circuit board 167, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etch, as will be appreciated by those skilled in the art. A battery (not shown) is also preferably carried by the housing 121 for supplying power to the circuitry 148. The term RE circuitry could encompass the interoperable RF transceiver circuitry, power circuitry and audio circuitry.

Furthermore, an audio output transducer 149 (e.g., a speaker) is carried by an upper portion 146 of the housing 121 and connected to the circuitry 148. One or more user input interface devices, such as a keypad (keyboard) 123 (FIG. 6), is also preferably carried by the housing 121 and connected to the circuitry 148. The term keypad as used herein also refers to the term keyboard, indicating the user input devices having lettered and/or numbered keys commonly known and other embodiments, including multi-top or predictive entry modes.

Other examples of user input interface devices include a scroll wheel 137 and a back button 136. Of course, it will be appreciated that other user input interface devices (e.g., a stylus or touch screen interface) may be used in other embodiments.

An antenna 145 is preferably positioned at the lower portion 147 in the housing and can be formed as a pattern of conductive traces that make an antenna circuit, which physically forms the antenna. It is connected to the circuitry 148 on the main circuit board 167. In one non-limiting example, the antenna could be formed on an antenna circuit board section that extends from the main circuit board at the lower portion of the housing. By placing the antenna 145 adjacent the lower portion 147 of the housing 121, the distance is advantageously increased between the antenna and the user's head when the phone is in use to aid in complying with applicable SAR requirements Also, a separate keyboard circuit board could be used.

More particularly, a user will typically hold the upper portion of the housing 121 very close to his head so that the audio output transducer 149 is directly next to his ear. Yet, the lower portion 147 of the housing 121 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances. In addition, the placement of the antenna 145 adjacent the lower portion 147 of the housing 121 also advantageously spaces the antenna farther away from the user's brain.

Another important benefit of placing the antenna 145 adjacent the lower portion 147 of the housing 121 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 147 of the housing 121. Accordingly, more reliable performance may be achieved from placing the antenna 145 adjacent the lower portion 147 of the housing 121.

Still another benefit of this configuration is that it provides more room for one or more auxiliary input/output (I/O) devices 150 to be carried at the upper portion 146 of the housing Furthermore, by separating the antenna 145 from the auxiliary I/O device(s) 150, this may allow for reduced interference therebetween.

Some examples of auxiliary I/O devices 150 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 150 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 150 means that such devices may have input and/or output capabilities, and they need not provide both in all embodiments. That is, devices such as camera lenses may only receive an optical input, for example, while a headphone jack may only provide an audio output.

The device 120 further illustratively includes a display 122, for example, a liquid crystal display (LCD) carried by the housing 121 and connected to the circuitry 148. A back button 136 and scroll wheel 137 can also be connected to the circuitry 148 for allowing a user to navigate menus, text, etc., as will be appreciated by those skilled in the art. The scroll wheel 137 may also be referred to as a "thumb wheel" or a "track wheel" in some instances. The keypad 123 illustratively includes a plurality of multi-symbol keys 124 each having indicia of a plurality of respective symbols thereon. The keypad 123 also illustratively includes an alternate function key 125, a next key 126, a space key 127, a shift key 128, a return (or enter) key 129, and a backspace/delete key 130.

The next key 126 is also used to enter a "*" symbol upon first pressing or actuating the alternate function key 125. Similarly, the space key 127, shift key 128 and backspace key 130 are used to enter a "0" and "#", respectively, upon first actuating the alternate function key 125. The keypad 123 further illustratively includes a send key 131, an end key 132, and a convenience (i.e., menu) key 139 for use in placing cellular telephone calls, as will be appreciated by those skilled in the art.

Moreover, the symbols on each key 124 are arranged in top and bottom rows. The symbols in the bottom rows are entered when a user presses a key 124 without first pressing the alternate function key 125, while the top row symbols are entered by first pressing the alternate function key. As seen in FIG. 2, the multi-symbol keys 124 are arranged in the first three rows on the keypad 123 below the send and end keys 131, 132. Furthermore, the letter symbols on each of the keys 124 are arranged to define a QWERTY layout. That is, the letters on the keypad 123 are presented in a three-row format, with the letters of each row being in the same order and relative position as in a standard QWERTY keypad.

Each row of keys (including the fourth row of function keys 125-129) is arranged in five columns. The multi-symbol keys 124 in the second, third, and fourth columns of the first, second, and third rows have numeric indicia thereon (i.e., 1 through 9) accessible by first actuating the alternate function key 125. Coupled with the next, space, and shift keys 126, 127, 128, which respectively enter a "*", "0", and "#" upon first actuating the alternate function key 125, as noted above, this set of keys defines a standard telephone keypad layout, as would be found on a traditional touch-tone telephone, as will be appreciated by those skilled in the art.

Accordingly, the mobile wireless communications device 120 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 145 is preferably formed as a multi-frequency band antenna, which provides enhanced transmission and reception characteristics over multiple operating frequencies. More particularly, the antenna 145 is designed to provide high gain, desired impedance matching, and meet applicable SAR requirements over a relatively wide bandwidth and multiple cellular frequency bands. By way of example, the antenna 145 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 145 may advantageously be implemented in three dimensions although it may be implemented in two-dimensional or planar embodiments as well.

The mobile wireless communications device shown in FIGS. 5 and 6 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 120 of FIGS. 5 and 6 is further described in the example below with reference to FIG. 7. The device 120 illustratively includes a housing 220, a keypad 240 and an output device 260. The output device 260 shown is preferably a display, which is preferably a full graphic LCD. Other types of output devices may alternatively be used. A processing device 280 is contained within the housing 220 and is coupled between the keypad 240 and the display 260. The processing device 280 controls the operation of the display 260, as well as the overall operation of the mobile device 120, in response to actuation of keys on the keypad 240 by the user.

The housing 220 may be elongated vertically, or may take on other sizes and shapes (including clamshell housing structures). The keypad may include a mode selection key, or other hardware or software for switching between text entry and telephony entry.

In addition to the processing device 280, other parts of the mobile device 120 are shown schematically in FIG. 7. These include a communications subsystem 201; a short-range communications subsystem 202; the keypad 240 and the display 260, along with other input/output devices 206, 208, 210 and 212; as well as memory devices 216, 218 and various other device subsystems 221. The mobile device 120 is preferably a two-way RF communications device having voice and data communications capabilities. In addition, the mobile device 120 preferably has the capability to communicate with other computer systems via the Internet.

Operating system software executed by the processing device 280 is preferably stored in a persistent store, such as the flash memory 216, but may be stored in other types of memory devices, such as a read only memory (ROM) or similar storage element. In addition, system software, specific device applications, or parts thereof, may be temporarily loaded into a volatile store, such as the random access memory (RAM) 218. Communications signals received by the mobile device may also be stored in the RAM 218.

The processing device 280, in addition to its operating system functions, enables execution of software applications 230A-230N on the device 120. A predetermined set of applications that control basic device operations, such as data and voice communications 230A and 230B, may be installed on the device 120 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 241. Preferably, the PIM data items are seamlessly integrated, synchronized and updated via the wireless network 241 with the device user's corresponding data items stored or associated with a host computer system.

Communication functions, including data and voice communications, are performed through the communications subsystem 201, and possibly through the short-range communications subsystem. The communications subsystem 201 includes a receiver 250, a transmitter 252, and one or more antennae 254 and 256. In addition, the communications subsystem 201 also includes a processing module, such as a digital signal processor (DSP) 258, and local oscillators (LOs) 261. The specific design and implementation of the communications subsystem 201 is dependent upon the communications network in which the mobile device 120 is intended to operate. For example, the mobile device 120 may include a communications subsystem 201 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 120.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 120 may send and receive communications signals over the communication network 241. Signals received from the communications network 241 by the antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communications functions, such as demodulation and decoding. In a similar manner, signals to be transmitted to the network 241 are processed (e.g., modulated and encoded) by the DSP 258 and are then provided to the transmitter 252 for digital to analog conversion, frequency up conversion, filtering, amplification and transmission to the communication network 241 (or networks) via the antenna 256.

In addition to processing communications signals, the DSP 258 provides for control of the receiver 250 and the transmitter 252. For example, gains applied to communications signals in the receiver 250 and transmitter 252 may be adaptively controlled through automatic gain control algorithms implemented in the DSP 258.

In a data communications mode, a received signal, such as a text message or web page download, is processed by the communications subsystem 201 and is input to the processing device 280. The received signal is then further processed by the processing device 280 for an output to the display 260, or alternatively to some other auxiliary I/O device 206. A device user may also compose data items, such as e-mail messages, using the keypad 240 and/or some other auxiliary I/O device 206, such as a touchpad, a rocker switch, a thumb-wheel, or some other type of input device. The composed data items may then be transmitted over the communications network 241 via the communications subsystem 201.

In a voice communications mode, overall operation of the device is substantially similar to the data communications mode, except that received signals are output to a speaker 210, and signals for transmission are generated by a microphone 212. Alternative voice or audio I/O subsystems, such as a voice message recording subsystem, may also be implemented on the device 120. In addition, the display 260 may also be utilized in voice communications mode, for example to display the identity of a calling party, the duration of a voice call, or other voice call related information.

Any short-range communications subsystem enables communication between the mobile device 120 and other proximate systems or devices, which need not necessarily be similar devices. For example, the short-range communications subsystem may include an infrared device and associated circuits and components, or a Bluetooth™ communications module to provide for communication with similarly-enabled systems and devices.

It should be understood that GSM is a preferred communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing can be used to allow about 8 speech channels per radio frequency channel, giving 8 radio time slots and 8 burst periods grouped into what is called a TDMA frame. For example, a channel data rate could be about 270.833 Kbps and a frame duration of about 4.615 milliseconds (MS) in one non-limiting example. The power output can vary from about 1 to about 2 watts.

Typically, linear predictive coding (LPC) can be used to reduce the bit rate and provide parameters for a filter to mimic a vocal track with speech encoded at about 13 Kbps. Four different cell sizes can be used in a GSM network, including macro, micro, pico and umbrella cells. A base station antenna can be installed on a master building above the average rooftop level in a macrocell. In a microcell, the antenna height can be under the average rooftop level and used in urban areas. Microcells typically have a diameter of about a few dozen meters and are used indoors. Umbrella cells can cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identify module (SIM) is usually implemented in the communications device, for example, the well known SIM card, similar to a smart card containing the subscription information and phone book of a user. The user can also switch handsets or could change operators by changing a SIM.

The GSM signaling protocol has three general layers Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer can oversee the radio and fixed link establishment between the mobile station and an MSE.

It is also possible to used Enhanced Data Rates for GSM Evolution (EDGE), as an enhancement to General Packet Radio Service (GPRS) networks. EDGE can use 8 Phase Shift Keying (8 PSK) and Gaussian Minimum Shift Keying (GMSK) for different modulation and coding schemes. A three-bit word can be produced for every changing carrier phase. A rate adaptation algorithm can adapt the Modulation and Coding Scheme (MCS) according to the quality of the radio channel and the bit rate and robustness of data transmission. Base stations are typically modified for EDGE use.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for implementing configuration data within a hardware component of a device when the device is under development or manufacture which comprises:
   creating within a processor associated with an establishment that develops or manufactures the device a standardized virtual part (SVP) file as a binary file comprising a) an SVP header that comprises metadata of one of at least schema version, revision numbers, part numbers, creator and description, b) hardware configuration data that comprises part-specific data for configuring the hardware component, and c) an SVP trailer that comprises error checking data for data authentication;
   loading the SVP file from the processor into an SVP manager application associated with the operating system of the device; and
   writing the SVP file from the SVP manager application into a memory of the device for configuring and controlling a specific hardware component within the device under development or manufacture.

2. The method according to claim 1, which further comprises adding a cryptographic signature to the SVP trailer for authenticating SVP files.

3. The method according to claim 1, which further comprises loading the SVP file into a non-volatile random access memory (NVRAM) of the device.

4. The method according to claim 3, which further comprises selecting the SVP file to be loaded into the NVRAM from a Bill of Material (SON) for the device.

5. The method according to claim 1, which further comprises storing the SVP file within a database containing manufacturing data about the device before loading the SVP file onto the device.

6. The method according to claim 1, which further comprises loading the SVP file into the device using Serial Transfer Protocol (STP) commands.

7. The method according to claim 1, which further comprises tracking hardware configuration data using a part number and version embedded within the header of the SVP file.

8. The method according to claim 1, which further comprises configuring register settings within the hardware component based on the hardware configuration data of the SVP file.

9. The method according to claim 1, which further comprises loading the SVP file using a SVP manager application on the device that is operable for at least one of authentication of SVP files, STP commands for loading SVP files, SVP file schema version and revision control on the device, and upgrade/downgrade scenarios.

10. The method according to claim 1, which further comprises storing the SVP file within a database containing manufacturing data and releasing the SVP file to an appropriate Bill of Material (BOM) before loading the SVP file on the device.

11. A system for implementing configuration changes within a hardware component of a device when the device is under development or manufacture, comprising:
    a processor external to the device and associated with an establishment that develops or manufactures the device, and an associated database that includes data related to manufacturing of the device, said processor operative for creating at least one binary standardized virtual part (SVP) file comprising a) a SVP header that comprises metadata of one of at least schema version, revision numbers, part numbers, creator and description, b) hardware configuration data that comprises part-specific data for configuring the hardware component, and c) a SVP trailer that comprises error checking data for data authentication; and
    a device having: a memory; a specific hardware component that is under development or manufacture; an SVP manager application into which the SVP file is loaded from the processor external to the device, wherein said SVP manager application is operable for at least one of authentication of SVP files; and serial transfer protocol (STP) commands for loading SVP files, SVP file schema version and revision control on the device and upgrade/downgrade scenarios.

12. The system according to claim 11, and further comprising a Bill of Material (BOM) to which the SVP file is added from the database.

13. The system according to claim 11, and further comprising a non-volatile memory on the device on which the SVP file is loaded.

14. The system according to claim 11, wherein said device includes predetermined register settings and said hardware configuration data is operative for changing the register settings.

15. The system according to claim 11, wherein said SVP trailer further comprises a cryptographic signature for authenticating SVP files.

16. The system according to claim 11, and further comprising an assembly line station for receiving the SVP file from the database and loading the SVP file onto a device during manufacturing.

17. The system according to claim 11, wherein said device includes operating system (OS) software and said SVP manager application is in said OS software.

* * * * *